United States Patent
Roger

(10) Patent No.: US 6,835,429 B2
(45) Date of Patent: Dec. 28, 2004

(54) MAKING IMPERMEABLE A PART FOR A MOTOR VEHICLE

(75) Inventor: Michel Roger, Serans (FR)

(73) Assignee: I.T.W. de France, Beauchamp (FR)

( * ) Notice: Subject to any disclaimer, the term of this patent is extended or adjusted under 35 U.S.C. 154(b) by 0 days.

(21) Appl. No.: 09/819,821

(22) Filed: Mar. 29, 2001

(65) Prior Publication Data
US 2001/0026870 A1 Oct. 4, 2001

(30) Foreign Application Priority Data
Apr. 4, 2000 (FR) .............................. 00 04282

(51) Int. Cl.$^7$ .................. B05D 1/02; B05D 7/22; B32B 1/02; B32B 1/08; B32B 25/08
(52) U.S. Cl. ............... 428/36.8; 428/36.91; 428/66.4; 428/335; 428/422; 428/521; 428/522; 427/230; 427/236; 427/393.5; 427/422
(58) Field of Search ................. 428/31, 36.8, 35.7, 428/36.91, 335, 422, 421, 906, 66.4, 521, 522; 427/233, 236, 385.5, 393.5, 421, 425, 230, 372.2, 422; 138/145; 220/562

(56) References Cited

U.S. PATENT DOCUMENTS

| | | | |
|---|---|---|---|
| 3,356,108 A | 12/1967 | Johnston | 138/143 |
| 3,935,347 A | 1/1976 | Blackwell | 427/388 |
| 4,237,177 A * | 12/1980 | Slama et al. | 428/215 |
| 4,400,482 A * | 8/1983 | Close | 524/114 |
| 4,800,109 A * | 1/1989 | Washizu | 428/34.9 |
| 5,093,166 A | 3/1992 | Nishimura | 428/36.2 |
| 5,129,544 A | 7/1992 | Jacobson et al. | 220/562 |
| 5,170,011 A * | 12/1992 | Martucci | 174/47 |
| 5,427,831 A * | 6/1995 | Stevens | 428/36.2 |
| 5,476,080 A | 12/1995 | Brunnhofer | 123/468 |
| 5,507,320 A * | 4/1996 | Plumley | 138/126 |
| 5,665,444 A * | 9/1997 | Eguchi et al. | 118/318 |
| 5,799,704 A * | 9/1998 | Andre | 138/137 |
| 6,090,459 A * | 7/2000 | Jadamus et al. | 428/36.4 |

FOREIGN PATENT DOCUMENTS

| | | |
|---|---|---|
| EP | 0391568 | 10/1990 |
| EP | 0582302 | 2/1994 |
| GB | 1396090 | 5/1975 |
| JP | 08074048 A * | 3/1996 |
| WO | WO 93/21466 | 10/1993 |

OTHER PUBLICATIONS

Encyclopedia of Polymer Science and Engineering, vol. 3, Coatings: Maintenance Coatings, pp. 653–657, Nov. 1985.*
Encyclopedia of Polymer Science and Engineering, vol. 3: Coatings, pp. 552–553, Nov. 1985.*
Alger, Polymer Science Dictionary, $2^{nd}$ Edition, pp. 335–336, Dec. 1997.*
Derwent Acc. No. 1996–206000, abstract of JP 8–74048 A, Mar. 1996.*
Database WPI Section Ch, Week 199731 Derwent Publications Ltd., London, GB; Class A14, AN 1997–335900 XP002156117 & JP 09 109703 A (Akurosu KK) Apr. 28, 1997 abrege.
Database WPI Section Ch, Week 199308 Derwent Publications Ltd., London, GB; Class A14, AN 1993–061386 XP002156116 & JP 05 008353 A (Tokai Rubber Ind Ltd), 19 Janvier 1993(Jan. 19, 1993) abrege.

* cited by examiner

Primary Examiner—Ramsey Zacharia
(74) Attorney, Agent, or Firm—Lowe Hauptman Gilman & Berner, LLP

(57) ABSTRACT

A part for a motor vehicle intended to come into contact with hydrocarbons has a polytetrafluoroethylene coating (3) adapted to make the part (1) impermeable. Use of a polytetrafluoroethylene coating for making impermeable parts of a motor vehicle on the fuel system, in order to limit the emission of hydrocarbons through these parts.

19 Claims, 1 Drawing Sheet

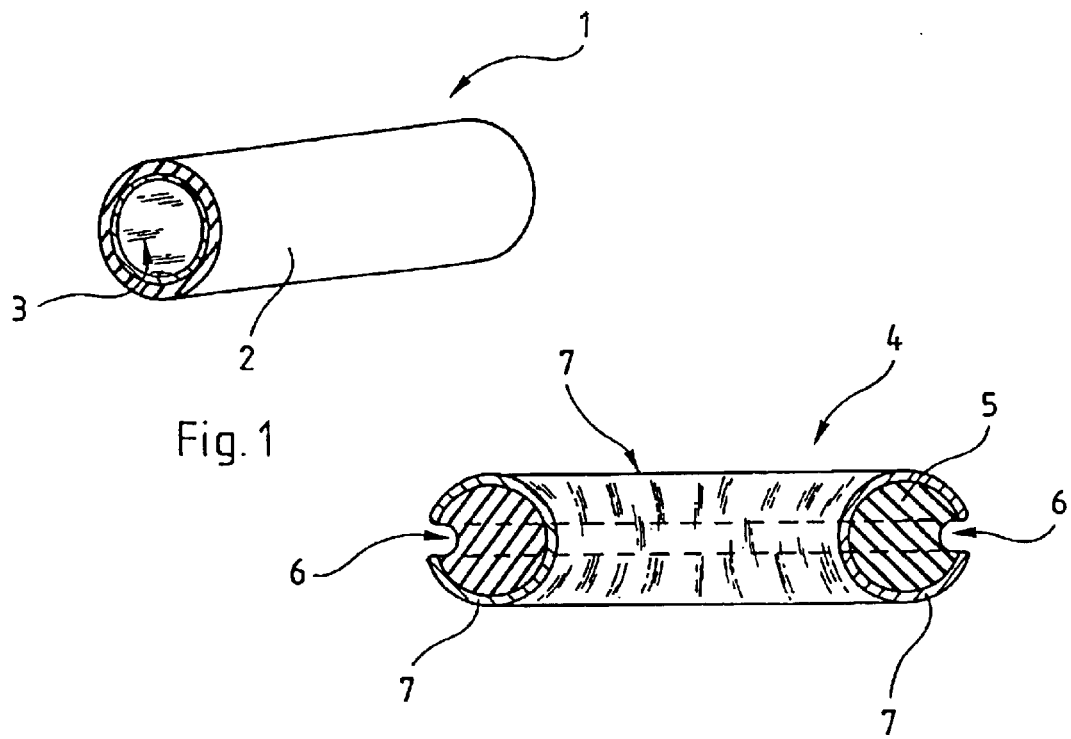
Fig. 1
Fig. 2
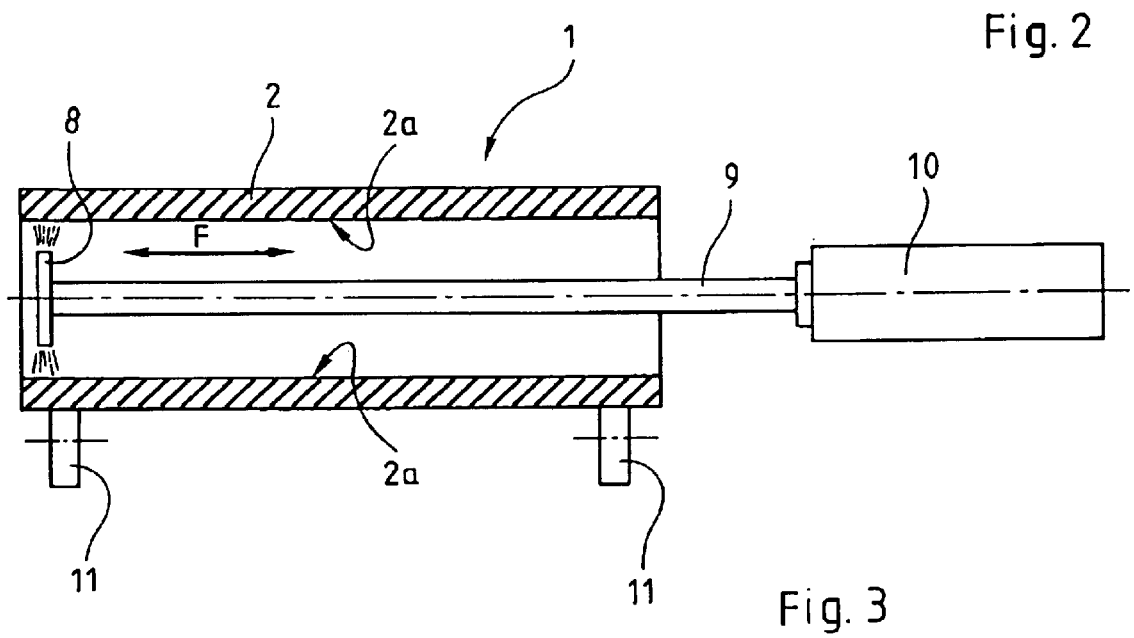
Fig. 3
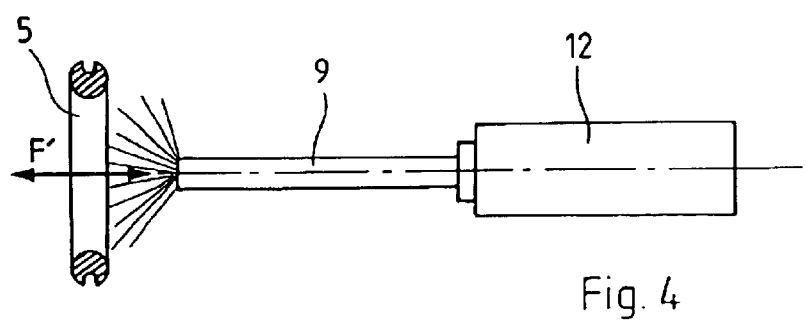
Fig. 4

MAKING IMPERMEABLE A PART FOR A MOTOR VEHICLE

TECHNICAL FIELD OF THE INVENTION

The present invention concerns a part for a motor vehicle intended to come into contact with hydrocarbons.

It also concerns a method of making such a part impermeable [referred to herein as proofing it].

BACKGROUND ART

In the field of motor vehicles, more and more stringent standards are applicable concerning the emission of hydrocarbons over the entire vehicle.

These standards fix a maximum threshold, in grams per 24 hours, for the evaporation of volatile organic compounds per vehicle.

By way of example, the Euro 2000 standard defines an acceptable hydrocarbon emission threshold of 2 g/24 hours per vehicle.

For parts intended to come into contact with hydrocarbons, that is to say the parts situated close to the vehicle fuel tank, the maximum threshold corresponding to this Euro 2000 standard is 0.7 g/24 hours.

The acceptable hydrocarbon emission thresholds over the entire vehicle are distributed according to the performance of the different components.

At the present time, amongst all the parts for motor vehicles which are in contact with hydrocarbons, in the liquid or gaseous phase, there is a first type of plastic product, commonly referred to as the envelope: the parts are for example the tank filling head, the cap etc.

Products of a second type are made of rubber, such as the sleeves, the joints, or the pipes in the vehicle fuel system.

In order to meet the standards applicable with regard to the emission of hydrocarbons, all the parts of the envelope currently receive a fluoration treatment for making them impermeable. The rubber products for their part are produced from fluorocarbon rubber.

However, this fluoration treatment and the use of a fluorocarbon rubber give rise to a significant increase in the manufacturing cost of these parts.

SUMMARY OF THE INVENTION

The purpose of the present invention is to effect proofing of these parts in contact with hydrocarbons which is able to limit the emission of hydrocarbons to the maximum possible extent, but without giving rise to a high manufacturing cost for these parts.

According to the invention, a part for a motor vehicle, intended to come into contact with hydrocarbons, has a polytetrafluoroethylene (PTFE) coating adapted to make this part impermeable.

The Applicant found that such a polytetrafluoroethylene coating, traditionally used for its anti-adhesion properties, unexpectedly made it possible to achieve a seal at the parts thus coated as regards the emission of the volatile organic compounds coming from the hydrocarbons.

The proofing of these parts can thus be achieved on parts traditionally used in motor vehicles, without modification to the manufacturing tooling.

According to a preferred characteristic of the invention, the polytetrafluoroethylene coating covers a wall intended to come into contact with hydrocarbons.

Thus the PTFE coating forms on the part a "barrier layer" in direct contact with the hydrocarbons in the liquid or gaseous phase, preventing any emission of gaseous components to the outside.

According to an advantageous characteristic of the invention, the thickness of the polytetrafluoroethylene coating is around a few tens of microns.

The longevity over time of these products coated with PTFE is appreciably greater than that of the products currently used, coated with a deposit of fluorine of a few microns, which rapidly erodes in time, notably because of the stirring of the fuel close to this deposit.

In practice, the part thus coated is made of plastic.

It may be used for components of the envelope, such as the tank caps or the fuel spouts.

Alternatively, the part thus coated can also be made of rubber, such as an elastomer.

The rubber is used in particular for producing pipes, sleeves or joints in the vehicle fuel system.

According to another aspect of the invention, a method of making impermeable a part for a motor vehicle intended to come into contact with hydrocarbons comprises a step of depositing a polytetrafluoroethylene coating.

The implementation of such a method does not require any particular precautions, unlike the methods currently used, using fluorine, which meet very strict regulations.

In practice, the polytetrafluoroethylene coating is deposited by spraying a liquid PTFE.

Such a method is similar to depositing paint with a gun in a suitable enclosure.

According to one advantageous characteristic of the invention, the deposited product comprises particles of PTFE, one or more solvents, and possibly a binding agent.

The use of solvents mixed with the PTFE particles makes it possible to spray this coating in liquid form onto the parts to be made impermeable.

In addition, adding a binding agent can help to stabilise this coating on the part to be treated, in particular depending on the material from which this part is produced.

According to an advantageous characteristic of the invention, the deposited product also comprises a pigment adapted to colour the PTFE coating.

It is thus possible, without complicating the manufacturing method, to colour a part coated with PTFE.

This colouring can in particular meet the requirements of the motor manufacturers who wish the joints visible outside the vehicle to be in a colour similar to that existing on the fuel pump nozzles in order to prevent any error during the filling of the vehicle tank.

Other features and advantages of the invention will also emerge from the following description.

BRIEF DESCRIPTION OF THE DRAWINGS

In the accompanying drawings, given by way of non-limitative examples:

FIG. 1 illustrates a pipe in accordance with one embodiment of the invention;

FIG. 2 is a view in transverse section of an O-ring seal in accordance with another embodiment of the invention;

FIG. 3 illustrates schematically a step in the proofing method according to the invention applied to a pipe; and FIG. 4 illustrates schematically a step in the proofing method according to the invention applied to an O-ring seal.

DETAILED DESCRIPTION OF THE INVENTION

A description will first of all be given, with reference to FIG. 1, of a part for a motor vehicle intended to come into contact with hydrocarbons in accordance with a first embodiment of the invention.

The parts to which the present invention relate correspond to the components of the fuel system of a motor vehicle.

These parts will to come into contact with hydrocarbons in liquid or gaseous phase in a petrol version of the motor vehicle.

These components are typically fuel spouts, caps, the vehicle canister, pipes, sleeves, joints, valves, notably placed in the tank cap, and possibly the tank itself.

FIG. 1 shows, by way of example, a tubular part 1, such as a pipe 1.

This pipe 1 is formed by a cylindrical body 2 made of elastomer.

For example, this cylindrical body 2 can be produced from rubber of the nitrile polyvinylchloride (nitrile PVC) type.

This pipe 1 has a polytetrafluoroethylene (PTFE) coating 3 adapted to make this part impermeable.

More precisely, in this embodiment, this PTFE coating covers the internal wall of the pipe 1, that is to say the wall which will come into contact with the petrol contained in this pipe.

The thickness of this PTFE coating is around a few tens of microns, typically between 10 and 35 $\mu$m.

This PTFE coating makes the pipe 1 impermeable and prevents hydrocarbons permeating through the wall of this pipe in which petrol is flowing.

The evaporation rate measured on such a pipe coated with PTFE is approximately one eighth of that which would be measured on the uncoated pipe.

With reference to FIG. 2, a description will be given of a second embodiment of the invention in which the part coated with PTFE is an O-ring seal for a spout joining piece, that is to say a joint which forms the seal at the tank cap.

The O-ring seal 4 is formed by a circular ring made of elastomer 5.

A peripheral groove 6 is generally provided on the external surface of this seal 4 to enable it to be mounted on the spout.

In accordance with the invention, a polytetrafluoroethylene coating 7 is deposited on the surface of this joint 4.

The maximum rate of evaporation measured at such a joint coated with PTFE is around 65 mg/24 hours.

Naturally, many other components of the fuel circuit of a motor vehicle are coated in the same way with a coating of PTFE.

In addition, not only the passive components such as the pipes or joints can be made impermeable by a PTFE coating, but also the valves, particularly the pressure/negative pressure valve which serves to equalise the internal and external pressures of the fuel tank.

This valve has, in a conventional manner, a membrane made of elastomer sheet on which it is possible to deposit a PTFE coating in order to obtain this effect of making it impermeable. The PTFE coating also gives this valve anti-adhesion properties.

With reference to FIGS. 3 and 4, a method of making parts for motor vehicles impermeable will be described more precisely.

This proofing method includes first of all a step of depositing a PTFE coating.

Preferably, this PTFE coating is deposited by atomisation or spraying of a liquid PTFE.

When this proofing method is applied to a tubular part 1, as illustrated in FIG. 3, a spray nozzle 8 is used for example.

This spray nozzle 8 is introduced inside the cylindrical body 2 forming the tubular part 1 so as to radially spray the PTFE coating over the internal wall 2a of the tubular part 1.

Preferably, the nozzle 8 and this tubular part 1 have a relative movement of translation and rotation in order to obtain a uniform deposit of PTFE on the internal wall 2a of this tubular part 1.

Here, by way of example, the nozzle 8 is mounted at the end of an arm 9 sliding in reciprocating motion in the direction of the arrow F from a machine 10 for spraying the coating.

In addition, the tubular part 1 is mounted on two pairs of rollers 11 disposed at the ends of the tubular part 1 and adapted to drive it in rotation about the arm 9 and the nozzle 8 spraying the coating.

The spray nozzle 8 can effect several outward and return travels within the tubular part 1 in order to obtain a sufficiently thick deposit of PTFE on the internal wall 2a of this part 1.

Naturally, the proofing method can be slightly modified according to the shape of the parts to be treated.

For example, for an O-ring seal 4 as illustrated in FIG. 2, generally a peripheral groove 6 is used for holding this seal in place, for example in a plate with an opening in it or by means of the jaws of a rotating chuck.

The coating of liquid PTFE can then be sprayed as illustrated in FIG. 4 on the O-ring seal 4 being held in place.

A spray nozzle 12 sprays the PTFE coating onto the joint 4.

As before, the spray nozzle 12 and the joint 4 are driven in a relative movement of translation and reciprocation in the direction of the arrow F'.

The product deposited during the spraying step is a product comprising particles of PTFE and one or more solvents adapted to fluidise the product with a view to its spraying by means of a nozzle.

Possibly, a binding or adhesion agent can be added to the product in order to facilitate the attachment of this coating to the material to be covered.

It is also possible to add, to the liquid coating before spraying, a colouring pigment in order to obtain the required colour on the part made impermeable.

Such a product based on liquid PTFE is sold for example by the company Whitford® under the brand name Xylan®.

More precisely, it can be Xylan 1632®, available commercially, whose viscosity and composition have been adjusted according to the material of the parts to which this coating will be applied.

After application of this liquid PTFE coating, the parts thus coated are subjected to a solvent removal step in order to obtain the evaporation of the solvent or solvents.

By way of example, this solvent removal step can be effected inside a heating tunnel, typically at a temperature of around 60° C.

This solvent removal step is then followed by a step of baking the coating, in a baking tunnel in which the temperature is around 150° C.

During these operations of solvent removal and baking, the particles of PTFE agglomerate together so as to form the coating, and the binding agent effects a bonding with the elastomer to which this coating is applied.

Naturally, many modifications can be made to the exemplary embodiments described above without departing from the scope of the invention.

The PTFE coating can for example be deposited on the external surface of a pipe.

Moreover, the PTFE coating can be deposited on a plastic part provided that the softening point of the plastics material used is above 180° C.

What is claimed is:

1. A part for a motor vehicle, which part is adapted to house and transport a fuel comprising hydrocarbons, which part comprises:

a portion comprising rubber, which portion is permeable to hydrocarbons emitted from said fuel; and a polytetrafluoroethylene coating directly bonded to a surface of said rubber, which coating is adapted to be disposed between the surface of said rubber and said fuel;

wherein said coating has a thickness of around a few tens of microns; and said coating is sufficient to reduce the transmission of said emitted hydrocarbons through said coated portion of said part to not more than 2 g/24 hours.

2. The part of claim 1, wherein said portion is a pipe, and said polytetrafluoroethylene coating has a thickness of 10 to 35 μm.

3. The part of claim 1, wherein said rubber comprises nitrile PVC.

4. A part for a motor vehicle, which part is adapted to be in contact with a fuel comprising hydrocarbons, which part comprises:

a portion comprising plastic or rubber, which portion is permeable to hydrocarbons emitted from said fuel; and a polytetrafluoroethylene coating bonded to a surface of the portion of plastic or rubber, which coating is adapted to be disposed between the surface of the portion of plastic or rubber and said fuel;

wherein said coating has a thickness of around a few tens of microns;

said coating is sufficient to reduce the transmission of said emitted hydrocarbons through said coated portion of said part to not more than 2 g/24 hours; and said portion comprising plastic or rubber is either an O-ring or a valve membrane which comprises a rubber elastomer sheet and on which said coating is disposed.

5. The part of claim 4, wherein said portion comprising plastic or rubber is the O-ring which has an outer perimeter and an inner perimeter; and a circumferential groove extending along the outer perimeter.

6. The part of claim 5, wherein the polytetrafluoroethylene coating is disposed on an entire exposed surface of said O-ring except in a region of said circumferential groove.

7. The part of claim 4, wherein said portion comprising plastic or rubber is the valve membrane.

8. The part of claim 4, wherein said polytetrafluoroethylene coating has a thickness of from 10 to 35 microns.

9. A method of reducing emission of hydrocarbons through a part of a motor vehicle, the part comprising a portion comprising plastic or rubber, which portion is adapted to be in contact with a fuel comprising said hydrocarbons and is permeable to the hydrocarbons emitted from said fuel, said method comprising:

depositing a polytetrafluoroethylene coating on a surface of said portion comprising plastic or rubber, which surface is adapted to be in contact with said hydrocarbons, said coating having a thickness of around a few tens of microns, wherein said coating is sufficient to reduce hydrocarbon emission through said coated portion of said part to not more than 2 g/24 hours;

wherein said depositing comprises spraying a liquid polytetrafluoroethylene onto said portion of said part.

10. The method of claim 9, wherein said polytetrafluoroethylene coating has a thickness of from 10 to 35 microns.

11. A method of reducing emission of hydrocarbons through a part of a motor vehicle, the part comprising a portion comprising plastic or rubber, which portion is adapted to be in contact with a fuel comprising said hydrocarbons and is permeable to the hydrocarbons emitted from said fuel, said method comprising:

depositing a polytetrafluoroethylene coating on a surface of said portion comprising plastic or rubber, which surface is adapted to be in contact with said hydrocarbons, said coating having a thickness of around a few tens of microns, wherein said coating is sufficient to reduce hydrocarbon emission through said coated portion of said part to not more than 2 g/24 hours;

wherein said depositing comprises depositing a composition comprising particles of polytetrafluoroethylene, at least one solvent and a bonding agent onto said portion of said part.

12. The method of claim 11, wherein said composition further comprises a pigment in an amount sufficient to color the polytetrafluoroethylene coating.

13. The method of claim 11, which further comprises after said depositing, removing said solvent from said composition while on the surface of said portion, and baking the coating at a temperature sufficient for said particles of polytetrafluoroethylene to agglomerate together.

14. The method of claim 13, wherein said removing comprises evaporating said solvent at about 60° C., and said baking is effected at about 150° C.

15. The method of claim 14, wherein the portion of rubber or plastic has a softening point of higher than 180° C.

16. The method of claim 11, wherein said polytetrafluoroethylene coating has a thickness of from 10 to 35 microns.

17. A method of reducing emission of hydrocarbons through a part of a motor vehicle, the part comprising a portion comprising plastic or rubber, which portion is adapted to be in contact with a fuel comprising said hydrocarbons and is permeable to the hydrocarbons emitted from said fuel, said method comprising:

depositing a polytetrafluoroethylene coating on a surface of said portion comprising plastic or rubber, which surface is adapted to be in contact with said hydrocarbons, said coating having a thickness of around a few tens of microns, wherein said coating is sufficient to reduce hydrocarbon emission through said coated portion of said part to not more than 2 g/24 hours; and before the step of depositing said coating, molding said portion of plastic or rubber.

18. The method of claim 17, wherein said polytetrafluoroethylene coating has a thickness of 10 to 35 μm.

19. The method of claim 17, wherein the portion of said part is made from a rubber elastomer.

\* \* \* \* \*